United States Patent
Bodette et al.

(10) Patent No.: US 10,418,808 B2
(45) Date of Patent: Sep. 17, 2019

(54) DETECTING ELECTROSTATIC DISCHARGE EVENTS IN A COMPUTER SYSTEM

(71) Applicant: LENOVO ENTERPRISE SOLUTIONS (SINGAPORE) PTE. LTD., Singapore (SG)

(72) Inventors: Edward J. Bodette, Cary, NC (US); Michael H. Crowder, Cary, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 15/430,586

(22) Filed: Feb. 13, 2017

(65) Prior Publication Data
US 2018/0233906 A1    Aug. 16, 2018

(51) Int. Cl.
*H02H 9/04*    (2006.01)

(52) U.S. Cl.
CPC .................. *H02H 9/045* (2013.01)

(58) Field of Classification Search
CPC ..................................... H02H 9/045
See application file for complete search history.

(56) References Cited

U.S. PATENT DOCUMENTS

| | | | |
|---|---|---|---|
| 6,259,371 B1* | 7/2001 | Chang | G06F 1/28 340/659 |
| 6,411,544 B1* | 6/2002 | Devin | G11C 16/12 365/185.01 |
| 6,819,539 B1* | 11/2004 | Wright | G06F 1/30 361/90 |
| 9,575,111 B1* | 2/2017 | Karp | G01R 31/26 |
| 2010/0271742 A1* | 10/2010 | Shannon | G01R 31/002 361/56 |
| 2016/0172849 A1* | 6/2016 | Dibra | H02H 9/046 361/56 |
| 2016/0285255 A1* | 9/2016 | O'Donnell | H02H 9/02 |

* cited by examiner

*Primary Examiner* — Scott Bauer

(57) ABSTRACT

Detecting electrostatic discharge ("ESD") events in a computer system, includes: determining, from an ESD detector installed in the computer system, that an ESD event has occurred; identifying a component of the computer system within a predefined proximity to the ESD detector as possibly affected by the ESD event; and notifying a user of the computer system of the component possibly affected by the ESD event.

20 Claims, 5 Drawing Sheets

DETECTING ELECTROSTATIC DISCHARGE EVENTS IN A COMPUTER SYSTEM

BACKGROUND

Field of Invention

The field of the present disclosure is data processing, or, more specifically, methods, apparatus, and products for detecting electrostatic discharge events in a computer system.

Description of Related Art

Electrostatic discharge ("ESD") is a sudden release of static electricity that occurs when a charged object, such as a human finger, comes in contact with a surface that is at a different potential energy. These discharges result in a pulse of energy which may have a very high voltage (at times from 1 kV to 15 kV). Such a pulse may disrupt nearby electronics. In computer systems today, many components of the computer system may be sensitive to ESD events and, as a result, an ESD event may cause the computer system to malfunction. To address ESD events in computer system, most solutions focus on preventing the occurrence of ESD events or limiting the possibility of an effect being caused by such an ESD events. No solutions currently address runtime monitoring and correction of such ESD events.

SUMMARY

Methods, apparatus, and products for detecting electrostatic discharge ("ESD") events in a computer system are disclosed in this specification. Such detection of ESD events in a computer system includes: determining, from an ESD detector installed in the computer system, that an ESD event has occurred; identifying a component of the computer system within a predefined proximity to the ESD detector as possibly affected by the ESD event; and notifying a user of the computer system of the component possibly affected by the ESD event.

The foregoing and other objects, features and advantages of the present disclosure will be apparent from the following more particular descriptions of exemplary embodiments of the present disclosure as illustrated in the accompanying drawings wherein like reference numbers generally represent like parts of exemplary embodiments of the disclosure.

DETAILED DESCRIPTION

Figure 1:
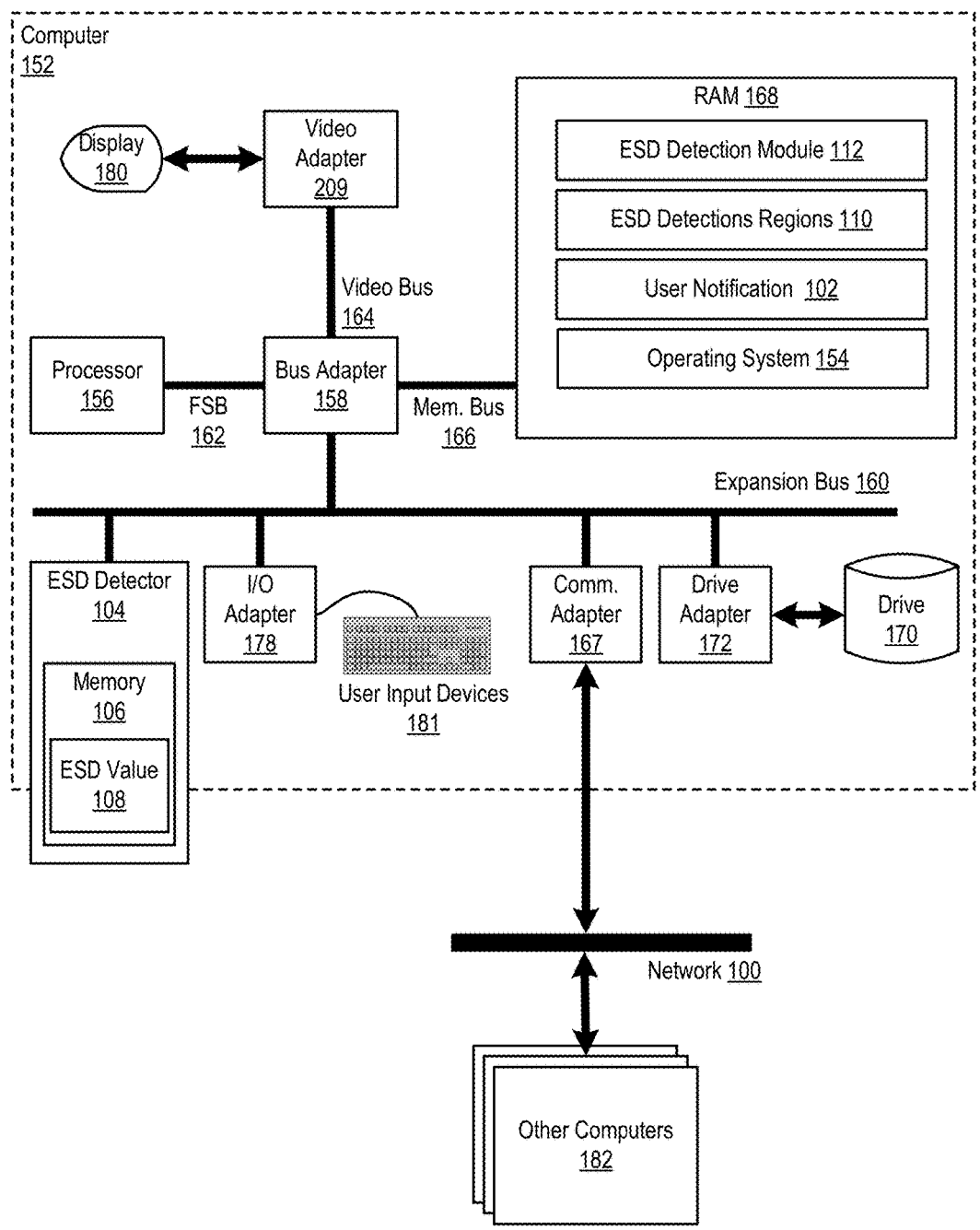
FIG. 1 sets forth a block diagram of an example system configured for detecting ESD events in a computer system according to embodiments of the present disclosure.

Exemplary methods, apparatus, and products for detecting ESD events in a computer system in accordance with the present disclosure are described with reference to the accompanying drawings, beginning with FIG. 1. FIG. 1 sets forth a block diagram of an example system configured for detecting ESD events in a computer system according to embodiments of the present disclosure. The system of FIG. 1 includes an example of automated computing machinery in the form of a computer system (152) configured for detecting ESD events in a computer system according to embodiments of the present disclosure. The computer (152) of FIG. 1 includes at least one computer processor (156) or "CPU" as well as random access memory (168) ("RAM") which is connected through a high speed memory bus (166) and bus adapter (158) to processor (156) and to other components of the computer (152).

Stored in RAM (168) is an ESD detection module (112), a module of computer program instructions that, when executed by the processor (156) causes the computer (152) to detect ESD events in a computer system. The ESD detection module (112) may detect such ESD events by: determining, from an ESD detector (104) installed in the computer system (152), whether an ESD event has occurred. An ESD detector (104) as the term is used in this specification refers to an electrical component that is susceptible to ESD events. Such an ESD detector may be a low-cost, off-the-shelf electronic component that is not shielded from ESD or is otherwise highly susceptible to ESD events. The ESD detector may be a component of any type. That is, the ESD detector may have a different primary purpose than detecting ESD. Consider, for example, that an I/O expander such as the PCA9555 from Texas Instruments™ may be utilized as an ESD detector while the primary, or original, purpose of the component is that of I/O expansion.

Such an ESD detector may be installed in the computer's chassis at a location with high susceptibility to ESD events (e.g. an opening in the chassis). Such locations that are highly susceptible to ESD events may include locations more likely to be contacted by a human. Consider, for example, that the computer (152) of FIG. 1 is implemented as a rack-mountable server. In such an embodiment, an ESD detector may be installed as part of a pull-out display panel of the computer. Because the pull-out display panel is typically operated by physical touch from a human, the area and components in proximity to the pull-out display panel are highly susceptible to ESD events.

In the example computer system (152) of FIG. 1, the ESD detector (104) is coupled to the expansion bus for purposes of explanation. Readers of skill in the art will recognize that such an ESD detector may be coupled to any number and different types of busses. For example, an ESD detector may be coupled to a service processor through an out-of-band bus, such as inter-integrated circuit (I2C) bus and the like.

The ESD detection module (112) may, upon startup of the computer system (152), initialize the ESD detector (104) by storing in memory (106) of the ESD detector, a predefined value (108). The predefined value may, for example, be a bit string. In such an embodiment, the ESD detector may determine whether an ESD event has occurred by detecting a change in the predefined value. Consider, for example, that the initialized ESD value is a sixteen bit string of ones. When an ESD event occurs, the value of the bit string may be altered due to the static discharge. As such, when the ESD detection module (112) inspects the ESD value and determines that the ESD value (108) does not match the initialized ESD value, the ESD detection module determines that an ESD event has occurred.

The ESD detection module (112) may also identify a component within a predefined proximity to the ESD detector as possibly affected by the ESD event. In some embodiments, the ESD detection module (110) may be configured with a number of ESD detection regions (110). Each detection region may be associated with an ESD detector and may specify components within a predefined proximity to the ESD detector. To that end, the ESD detection module may identify any of the components within the ESD detection region as a component possibly affected by the ESD event.

The ESD detection module may then notify (102) a user of the computer system of the component possibly affected by the ESD event. In this way, a user may be made aware of a possible ESD event and take further action.

Also stored in RAM (168) is an operating system (154). Operating systems useful in computers configured for detecting ESD events in a computer system according to embodiments of the present disclosure include UNIX™, Linux™, Microsoft Windows™, AIX™, IBM's iOS™, and others as will occur to those of skill in the art. The operating system (154) and ESD detection module (112) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for detecting ESD events in a computer system according to embodiments of the present disclosure include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (152) of FIG. 1 includes one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for detecting ESD events in a computer system according to embodiments of the present disclosure include modems for wired dial-up communications, Ethernet (IEEE 802.3) adapters for wired data communications, and 802.11 adapters for wireless data communications.

The arrangement of components making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
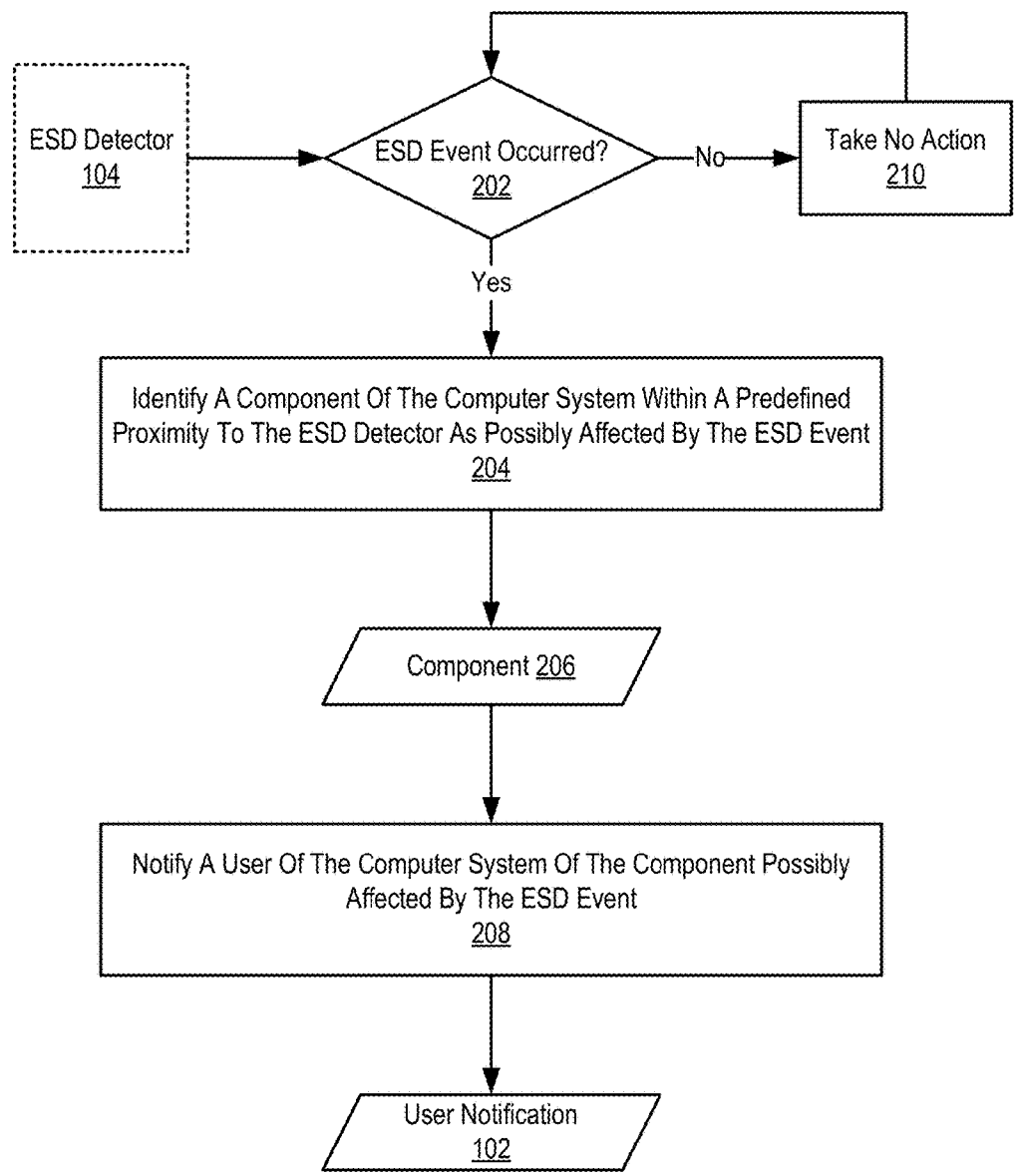
FIG. 2 sets forth a flow chart illustrating an exemplary method for detecting ESD events in a computer system according to embodiments of the present disclosure.

For further explanation, FIG. 2 sets forth a flow chart illustrating an exemplary method for detecting ESD events in a computer system according to embodiments of the present disclosure. The method of FIG. 2 includes determining (202), from an ESD detector installed in the computer system, whether an ESD event has occurred. As mentioned above, determining (202) whether an ESD event has occurred may be carried out by determining that a value stored in memory of the ESD detector has been altered from a preconfigured state.

If an ESD event has not occurred, the method of FIG. 2 continues by taking (210) no further action in relation to an ESD event. If, however, an ESD even has occurred, the method of FIG. 2 continues by identifying (204) a component (206) within a predefined proximity to the ESD detector as possibly affected by the ESD event. Identifying (204) components within a predefined proximity to the ESD detector as possibly affected by the ESD event may be carried out in a variety of ways. In some embodiments, the module carrying out the method of FIG. 2 may be preconfigured with a data structure that specifies components in proximity to each ESD detector. In some embodiments, an ESD detector may be installed as part of a subsystem and the components within that subsystem are identified as being components within the predefined proximity to the ESD detector. Readers of skill in the art will recognize that there are many other ways in which components within a predefined proximity to an ESD detector may be identified as possibly affected by the ESD event. Each such way is well within the scope of embodiments of the present disclosure.

Readers will recognize that an ESD may cause unpredictable effects. As such, the ESD detector does not indicate that the components have been actually affected, but rather that the components may have been potentially affected by the ESD event. In some embodiments, diagnostics may be run automatically without a user's intervention in response to the detection of the ESD event to determine whether a component is actually affected by the ESD event.

To that end, the method of FIG. 2 also includes notifying (208) a user of the computer system of the component possibly affected by the ESD event. Such a notification (102) may be provided to a user in a variety of ways, including for example, as a system notification, as notification from a service processor to a management module, as an email message, as a text message, and so on as will occur to readers of skill in the art. The user, upon receiving the notification may inspect the component identified as possibly being affected by the ESD event. As mentioned above, in some embodiments, the component may, automatically and without a user's intervention, run diagnostics to determine whether the component was affected by the ESD event. In such embodiments, the user notification (102) may also include the results of such diagnostics.

Figure 3:
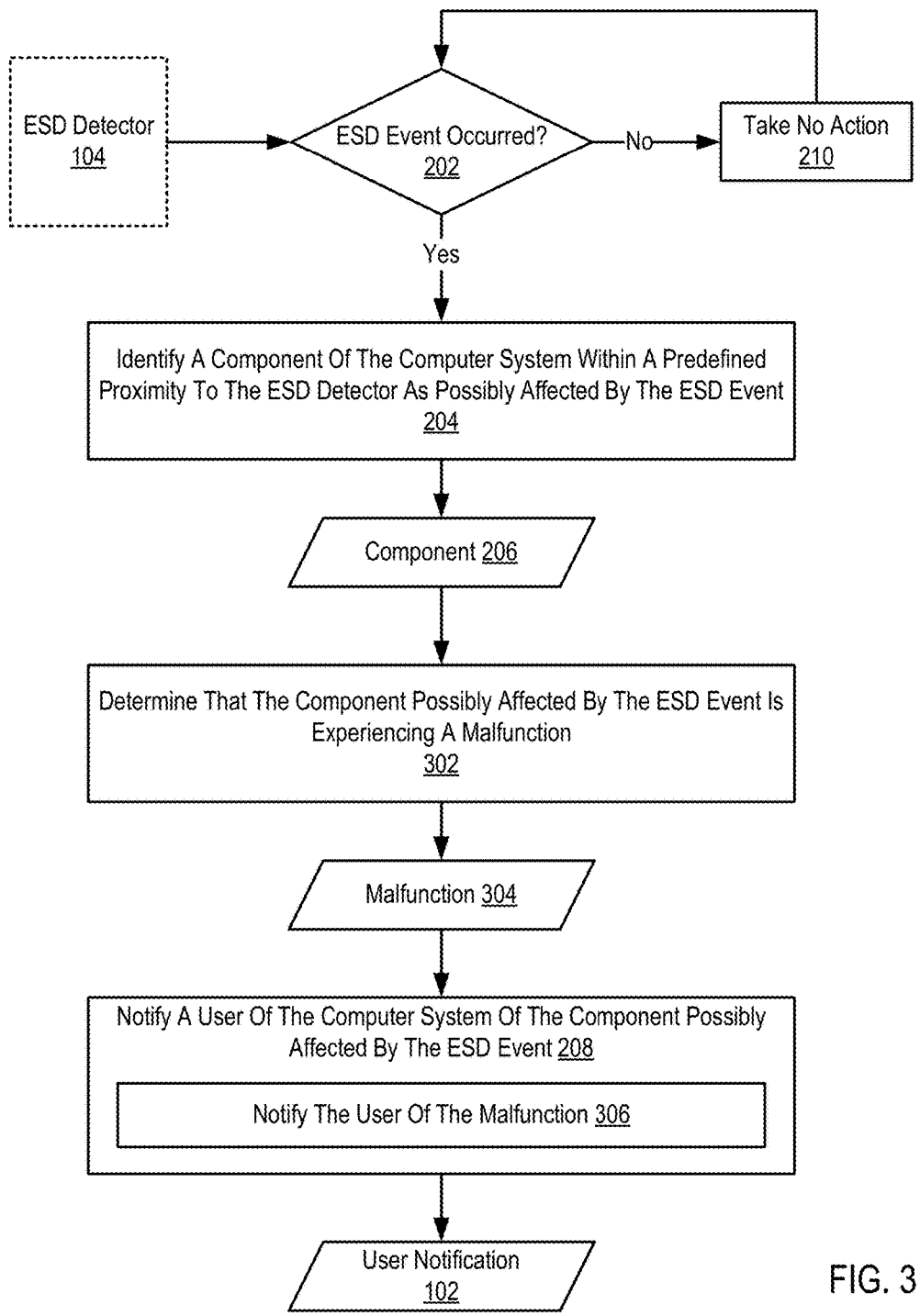
FIG. 3 sets forth a flow chart illustrating another example method for detecting ESD events in a computer system according to embodiments of the present disclosure.

For further explanation, FIG. 3 sets forth a flow chart illustrating another example method for detecting ESD events in a computer system according to embodiments of the present disclosure. The method of FIG. 3 is similar to the method of FIG. 2 in that the method of FIG. 3 also includes: determining (202), from an ESD detector installed in the computer system, whether an ESD event has occurred; identifying (204) a component (206) within a predefined proximity to the ESD detector as possibly affected by the ESD event; and notifying (208) a user of the computer system of the component possibly affected by the ESD event.

The method of FIG. 3 differs from the method of FIG. 2, however, in that the method of FIG. 3 also includes determining (302) that the component possibly affected by the ESD event is experiencing a malfunction (304). Determining (302) that the components is experiencing a malfunction may be carried out in a variety of ways including, for example: running diagnostic tests on or by the component to identify malfunctions; reporting a malfunction by the component without the need for any diagnostic; inferring from error logs that a malfunction has occurred in the component, or in other ways as will occur to readers of skill in the art.

To that end, notifying (208) the user of the component possibly affected by the ESD event in the method of FIG. 3 also includes notifying (306) the user of the malfunction. Such a notification may include any combination of: an identifier of the component, the time of the malfunction, the type of malfunction, and any other parameters as will occur to readers of skill in the art.

Figure 4:
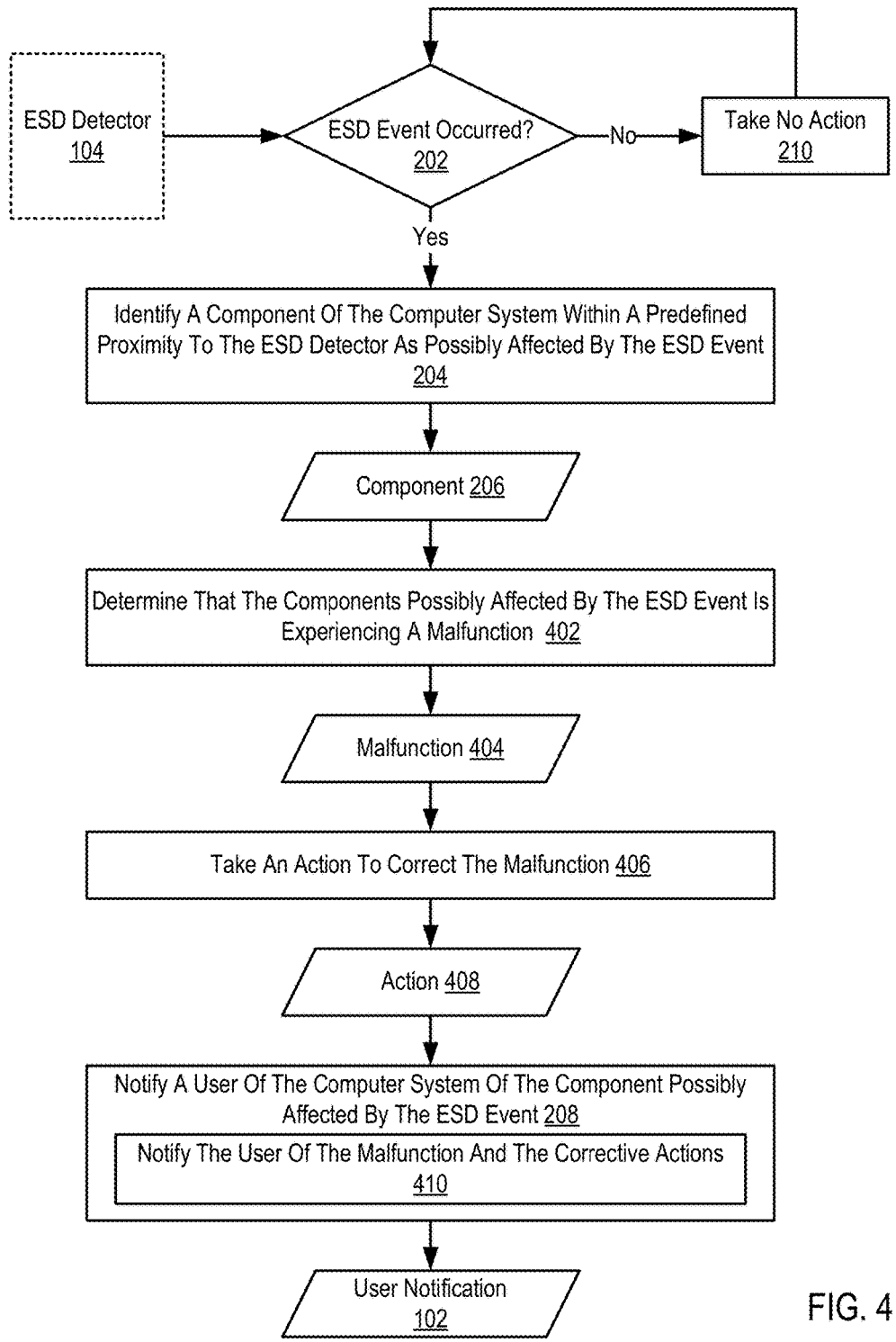
FIG. 4 sets forth a flow chart illustrating another example method for detecting ESD events in a computer system according to embodiments of the present disclosure.

For further explanation, FIG. 4 sets forth a flow chart illustrating another example method for detecting ESD events in a computer system according to embodiments of the present disclosure. The method of FIG. 4 is similar to the method of FIG. 2 in that the method of FIG. 4 also includes: determining (202), from an ESD detector installed in the computer system, whether an ESD event has occurred; identifying (204) a component (206) within a predefined proximity to the ESD detector as possibly affected by the ESD event; and notifying (208) a user of the computer system of the component possibly affected by the ESD event.

The method of FIG. 4 also incorporates portions of FIG. 3 including determining (402) that the component possibly affected by the ESD event is experiencing a malfunction (404). The method of FIG. 4, however, differs from the method of FIG. 3 and the method of FIG. 2 in that the method of FIG. 4 also includes taking (406) an action (408) to correct the malfunction. In the example of FIG. 4, taking (406) a corrective action is carried out autonomously without user intervention. Readers of skill in the art will recognize that taking such corrective actions may be carried out in a variety of ways and each such way may be dependent on the component, the type of malfunction, user settings specifying permissions for corrective actions, workload currently in progress, power state of the computer, and so on. In some embodiments, for example, taking a corrective action for a component experiencing a malfunction may include resetting or power-cycling the component or the subsystem that includes the component.

In the method of FIG. 4, notifying (208) the user of the component possibly affected by the ESD event also includes notifying (410) the user of the malfunction, the action taken to correct the malfunction, and the outcome of the action.

Figure 5:
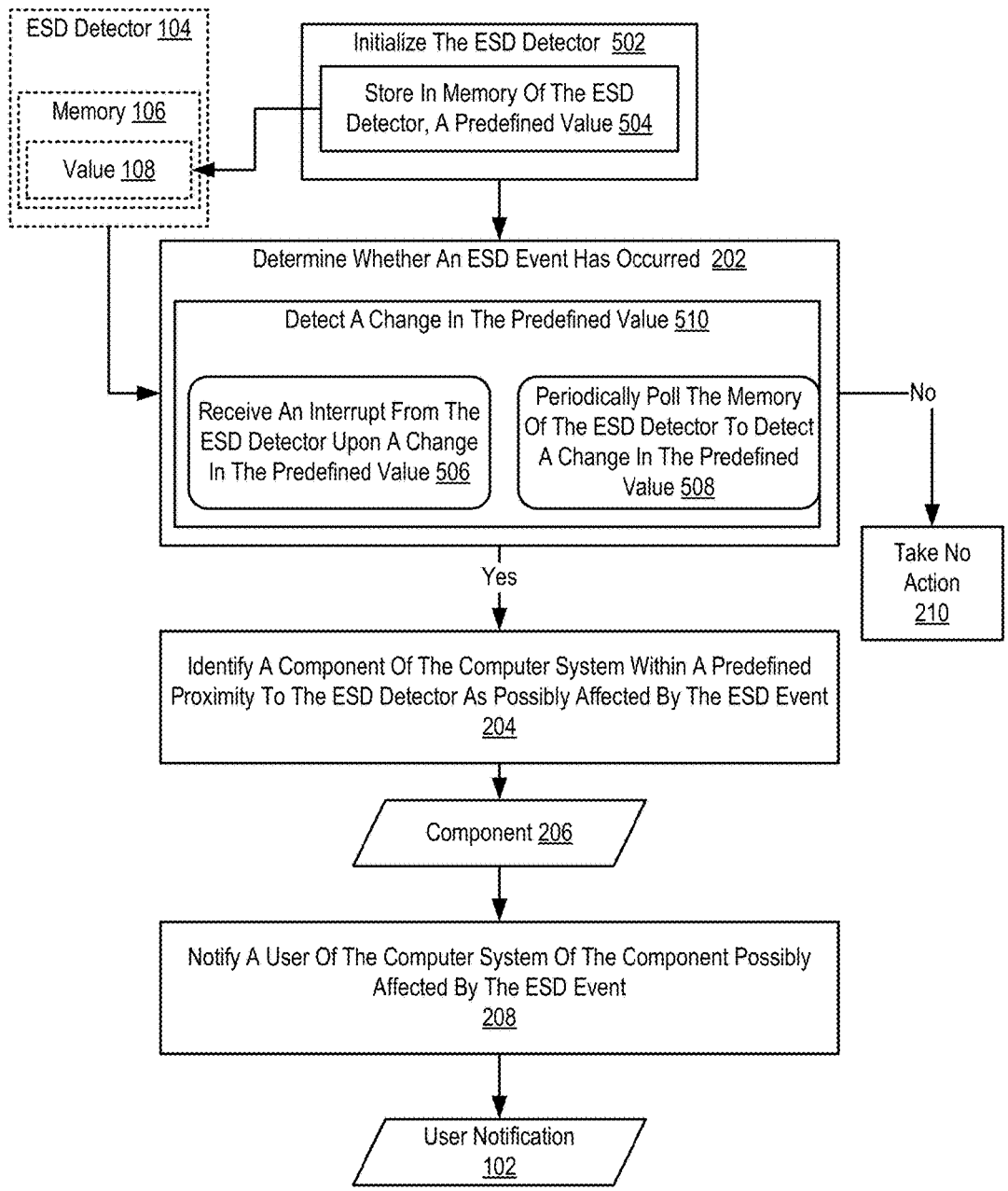
FIG. 5 sets forth a flow chart illustrating another example method for detecting ESD events in a computer system according to embodiments of the present disclosure.

For further explanation, FIG. 5 sets forth a flow chart illustrating another example method for detecting ESD events in a computer system according to embodiments of the present disclosure. The method of FIG. 5 is similar to the method of FIG. 2 in that the method of FIG. 5 also includes: determining (202), from an ESD detector installed in the computer system, whether an ESD event has occurred; identifying (204) a component (206) within a predefined proximity to the ESD detector as possibly affected by the ESD event; and notifying (208) a user of the computer system of the component possibly affected by the ESD event.

The method of FIG. 5 differs from the method of FIG. 2, however, in that the method of FIG. 5 includes initializing (502) the ESD detector (104). In the method of FIG. 5, initializing the ESD detector (104) is carried out by storing (504) in memory (106) of the ESD detector, a predefined value (108), though other implementations of initializing (502) may be performed without departing from the scope of the present disclosure.

In the method of FIG. 5, determining (202) whether an ESD event has occurred is carried out by detecting (510) a change in the predefined value (108). In the method of FIG. 5, detecting (510) a change in the predefined value may be carried out in a variety of ways. In one such way, detecting (510) a change in the predefined value may be carried out by receiving (506) an interrupt from the ESD detector upon a change in the predefined value. Alternatively, detecting (510) a change in the predefined value may be carried out by periodically polling (508) the memory of the ESD detector.

Aspects of the present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense.

What is claimed is:

1. A method comprising:
   determining, from an electrostatic discharge ("ESD") detector installed in a computer system, that an ESD event has occurred;
   identifying a component of the computer system as possibly affected by the ESD event based on detection region information that specifies the component is within a predefined proximity to the ESD detector; and
   notifying a user of the computer system of the component possibly affected by the ESD event.

2. The method of claim 1 wherein:
   the ESD detector is installed at a location within the computer system predetermined to be susceptible to ESD events.

3. The method of claim 1 further comprising:
   after identifying the component possibly affected by the ESD event, determining that the component possibly affected by the ESD event is experiencing a malfunction;
   wherein notifying the user of the component possibly affected by the ESD event further comprises notifying the user of the malfunction.

4. The method of claim 1 further comprising:
   after identifying the component possibly affected by the ESD event, determining that the component possibly affected by the ESD event is experiencing a malfunction; and
   taking an action to correct the malfunction;
   wherein notifying the user of the component possibly affected by the ESD event further comprises notifying the user of the malfunction, the action taken to correct the malfunction, and the outcome of the action.

5. The method of claim 1 further comprising:
   storing in memory of the ESD detector, a predefined value usable to initialize the ESD detector;

wherein determining that an ESD event has occurred further comprises detecting a change in the predefined value.

6. The method of claim 5 wherein determining that an ESD event has occurred further comprises receiving an interrupt from the ESD detector upon a change in the predefined value.

7. The method of claim 5 wherein determining that an ESD event has occurred further comprises periodically polling the memory of the ESD detector to detect a change in the predefined value.

8. An apparatus comprising a computer processor and a computer memory operatively coupled to the computer processor, wherein the computer memory includes computer program instructions configured to:
   determine, from an electrostatic discharge ("ESD") detector installed in a computer system, that an ESD event has occurred;
   identify a component of the computer system as possibly affected by the ESD event based on detection region information that specifies the component is within a predefined proximity to the ESD detector; and
   notify a user of the computer system of the component possibly affected by the ESD event.

9. The apparatus of claim 8 wherein:
   the ESD detector is installed at a location within the computer system predetermined to be susceptible to ESD events.

10. The apparatus of claim 8 further comprising computer program instructions configured to:
    after identifying the component possibly affected by the ESD event, determine that the component possibly affected by the ESD event is experiencing a malfunction;
    wherein notifying the user of the component possibly affected by the ESD event further comprises notifying the user of the malfunction.

11. The apparatus of claim 8 further comprising computer program instructions configured to:
    after identifying the component possibly affected by the ESD event, determine that the component possibly affected by the ESD event is experiencing a malfunction; and
    take an action to correct the malfunction;
    wherein notifying the user of the component possibly affected by the ESD event further comprises notifying the user of the malfunction, the action taken to correct the malfunction, and the outcome of the action.

12. The apparatus of claim 8 further comprising computer program instructions configured to:
    store in memory of the ESD detector, a predefined value usable to initialize the ESD detector;
    wherein determining that an ESD event has occurred further comprises detecting a change in the predefined value.

13. The apparatus of claim 12 wherein determining that an ESD event has occurred further comprises receiving an interrupt from the ESD detector upon a change in the predefined value.

14. The apparatus of claim 12 wherein determining that an ESD event has occurred further comprises periodically polling the memory of the ESD detector to detect a change in the predefined value.

15. A computer program product comprising a computer readable medium, the computer readable medium comprising computer program instructions configured to:
    determine, from an electrostatic discharge ("ESD") detector installed in a computer system, that an ESD event has occurred;
    identify a component of the computer system as possibly affected by the ESD event based on detection region information that specifies the component is within a predefined proximity to the ESD detector; and
    notify a user of the computer system of the component possibly affected by the ESD event.

16. The computer program product of claim 15 wherein:
    the ESD detector is installed at a location within the computer system predetermined to be susceptible to ESD events.

17. The computer program product of claim 15 further comprising computer program instructions configured to:
    after identifying the component possibly affected by the ESD event, determine that the component possibly affected by the ESD event is experiencing a malfunction;
    wherein notifying the user of the component possibly affected by the ESD event further comprises notifying the user of the malfunction.

18. The computer program product of claim 15 further comprising computer program instructions configured to:
    after identifying the component possibly affected by the ESD event, determine that the component possibly affected by the ESD event is experiencing a malfunction; and
    take an action to correct the malfunction;
    wherein notifying the user of the component possibly affected by the ESD event further comprises notifying the user of the malfunction, the action taken to correct the malfunction, and the outcome of the action.

19. The computer program product of claim 15 further comprising computer program instructions configured to:
    store in memory of the ESD detector, a predefined value usable to initialize the ESD detector;
    wherein determining that an ESD event has occurred further comprises detecting a change in the predefined value.

20. The computer program product of claim 19 wherein determining that an ESD event has occurred further comprises receiving an interrupt from the ESD detector upon a change in the predefined value.

* * * * *